US006539003B1

(12) United States Patent
Agarwal et al.

(10) Patent No.: US 6,539,003 B1
(45) Date of Patent: Mar. 25, 2003

(54) METHOD FOR ACQUISITION AND SYNCHRONIZATION OF TERMINALS IN A SATELLITE/WIRELESS TDMA SYSTEM

(75) Inventors: Anil K. Agarwal, Gaithersburg, MD (US); Charles R. Thorne, Rohrersville, MD (US); Udayan Narayan Borkar, Germantown, MD (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 09/331,407
(22) PCT Filed: Oct. 20, 1998
(86) PCT No.: PCT/US98/22053
§ 371 (c)(1),
(2), (4) Date: Sep. 21, 1999
(87) PCT Pub. No.: WO99/21295
PCT Pub. Date: Apr. 29, 1999

Related U.S. Application Data

(60) Provisional application No. 60/062,496, filed on Oct. 20, 1997, provisional application No. 60/064,673, filed on Oct. 20, 1997, and provisional application No. 60/062,497, filed on Oct. 20, 1997.

(51) Int. Cl.$^7$ .............................................. H04B 7/212
(52) U.S. Cl. ...................... 370/324; 370/442; 370/337; 370/321; 455/427; 455/12.1; 455/13.1
(58) Field of Search ................................. 370/324, 322, 370/442, 323, 336, 337, 347, 321, 503, 509, 510; 455/427, 428, 429, 430, 12.1, 13.1, 13.3; 375/355, 356, 138

(56) References Cited

U.S. PATENT DOCUMENTS

| | | | |
|---|---|---|---|
| 4,688,216 A | | 8/1987 | Saburi |
| 4,689,787 A | | 8/1987 | Hotta |
| 4,774,708 A | * | 9/1988 | Hotta ........................... 370/321 |
| 4,827,474 A | * | 5/1989 | Le Goffic et al. ........... 370/347 |
| 5,072,445 A | | 12/1991 | Nawata |
| 5,261,118 A | * | 11/1993 | Vanderspool, II et al. . 455/51.2 |
| 5,363,373 A | * | 11/1994 | Nakahara et al. ............ 370/314 |
| 5,402,424 A | * | 3/1995 | Kou ............................ 370/324 |
| 5,483,537 A | * | 1/1996 | Dupuy ........................ 370/337 |
| 5,598,419 A | | 1/1997 | Weigand et al. |
| 5,613,195 A | * | 3/1997 | Ooi .............................. 375/356 |
| 5,625,640 A | * | 4/1997 | Palmer et al. ............... 342/352 |
| 5,790,939 A | * | 8/1998 | Malcolm et al. ............ 370/324 |
| 5,867,489 A | * | 2/1999 | Hershey et al. ............. 370/324 |

* cited by examiner

Primary Examiner—Andrew T. Harry
(74) Attorney, Agent, or Firm—Sughrue Mion, PLLC

(57) ABSTRACT

A TDMA system (11) is provided using a programmable, fixed-period frame structure for communication between network terminals (6,10). All bursts are timed with respect to this programmable periodic frame. Each terminal (6,10) uses its local clock to generate a transmit frame period and a receive frame period. According to the invention an Acquisition and Synchronization procedure is provided to align the start of transmit frame period and start of receive frame period and start of receive frame period at each terminal in such a way that if a burst is transmitted by any terminal at offset x after local start of transmit frame period, then all terminals receive that burst a position y after their local start of receive frame periods, where Ýy–xÝ is less than a small threshold value. In addition, a number of different types of bursts are used for communication between terminals. The various types of bursts are programmable. In other words, the parameters defining the bursts, such as length, frequency, and location within a frame may be dynamically assigned by the network based on monitored network conditions.

35 Claims, 5 Drawing Sheets

Oi = OFFSET OF BURST FROM SOTF

METHOD FOR ACQUISITION AND SYNCHRONIZATION OF TERMINALS IN A SATELLITE/WIRELESS TDMA SYSTEM

CROSS REFERENCE TO RELATED APPLICATIONS

This application is based on and claims priority from U.S. Provisional Patent Application Serial Nos. 60/062,496, 60/064,673, and 60/062,497 filed Oct. 20, 1997 which are incorporated herein by reference in their entirety for all purposes.

BACKGROUND

The present invention relates generally to communications systems and in particular to a technique to perform TDMA timing in a satellite, terrestrial wireless, and cable based systems.

Time Division Multiple Access (TDMA) is one of several techniques used to design distributed satellite, wireless, and cable based systems. A TDMA system provides a single communication channel that is efficiently shared among multiple geographically distributed communication terminals. In such a system, different terminals share a channel's bandwidth by transmitting on the channel with precisely timed short bursts of data. Because the timing for the bursts must be precise, the TDMA system provides each terminal with a very accurate time base. The time base is used to precisely time the terminal's transmissions into the channel so that the burst transmissions from different terminals do not overlap in time.

Each of the terminals must acquire the system timing so that the terminal can become synchronized with other terminals within the overall system. However, acquiring a lock to the system timing is difficult and can be lengthy. Furthermore, most systems have a large guard time which allow for uncertainty in timing among the different terminals. A large guard time is undesirable because of the resulting loss of usable bandwidth.

The problem of providing accurate timing is made difficult by a number of factors. First, different stations or terminals have different amounts of propagation delay between terminals. Second, the delay between terminals changes with time as the distance traversed by the transmission terminals changes. For example, in geo-synchronous satellite systems, the delay can be caused by imperfections in satellite orbit. In non-geo-synchronous satellite systems, the delay can be caused by the nature of the satellite orbit. In mobile satellite or terrestrial wireless systems the delay may be caused by the movement of the terminals. Finally, as terminals use a local clock to derive TDMA timing, inaccuracies and variations in the local clock can also cause TDMA timing to drift with the passage of time.

In addition, conventional satellite systems communicate on bursts within the frames which have preallocated parameters such as length, frequencies, and the location of the burst within a frame. These parameters are typically fixed at the terminals, and although they can be changed from time to time, they may not be dynamically allocated or reprogrammed, on the fly, by the network controller. As a result, the network system is rigid and not able to adapt to real-time changes in demand for bandwidth. Therefore, system resources are wasted due to the fixed or pre-established nature of the network architecture.

SUMMARY

It is therefore an object of the invention to provide an improved acquisition and synchronization of all terminals in time, so that bursts transmitted by different terminals do not overlap in time, and that a burst transmitted by one terminal arrives at the appropriate time at the receiving terminal.

It is another object of the invention to enable bursts to be positioned close to one another (within a few microseconds) and assure that bursts from different terminals do not overlap in time. As a result, satellite delay variations of several milliseconds should be accommodated according to the invention.

It is yet another object of the invention to allow terminals to adjust their timing in a short period of time after they are turned on.

It is a further object of the invention to allow terminals to join the network without adversely impacting terminals that are actively carrying traffic in the network.

According to an exemplary embodiment of the invention a satellite or wireless based TDMA system uses a programmable, fixed-period frame structure. All bursts are timed with respect to this programmable periodic frame. Each terminal uses its local clock to generate a transmit frame period and a receive frame period. The start of a transmit frame period is known as Start of Transmit Frame. The start of a receive frame period is known as Start of Receive Frame. According to the invention, an Acquisition and Synchronization procedure is provided to align the start of transmit frame and start of receive frame at each terminal in such a way that if a burst is transmitted by any terminal at offset x after a local start of receive frame of the terminal, then all terminals receive that burst at position y after their local SORFs, where $|y-x|$ is less than a small threshold value, for example, 5 microseconds.

In addition, the invention uses a number of bursts for communication between terminals. According to an embodiment of the invention, the various bursts are programmable. In other words, the parameters defining the bursts, such as length, frequency, and location within a frame may be reprogrammed by the network through communication with the terminals. As a result, the parameter may be dynamically allocated based on monitored network conditions. A number of different bursts are used for network communications. Reference Bursts are transmitted by reference terminals and are received by all traffic terminals. The Reference Bursts carry network management messages from the network command controller or reference terminal to all other terminals. Reference Bursts are also used by all receiving terminals to derive frame timing. Signaling bursts are transmitted by traffic terminals and received by the reference terminal. Signaling Bursts are used carry network management messages from the terminals to the network command controller or reference terminal. Traffic bursts are used to carry user traffic. Traffic Bursts are transmitted by traffic terminals and reference terminals and received by the traffic terminals and reference terminals. Acquisition bursts are used during transmit acquisition of traffic terminals. Acquisition Bursts are transmitted by traffic terminals and received by a reference terminal. Control bursts are used to maintain a traffic terminal transmit synchronization. Control Bursts are transmitted by traffic terminals and received by a reference terminal.

According to the present invention, the system is able to handle global, spot, and mixed mode beam configurations. In addition, the system is able to handle multiple spot beams, large numbers of terminals, multiple carriers, and multiple reference bursts. Furthermore, the procedures are simple, uniform, and robust and do not require special purpose hardware support. The system according the exemplary embodiments of the invention can also handle large doppler and local clock variations. As a result, the system is suitable for large delay satellite networks, as well as, low to medium delay terrestrial wireless and cable networks.

The system according to the present invention also provides that all parameters are programmable making it easy to modify and optimize communications for specific networks and real time condition. Procedures are controlled using message exchanges which are not hard assigned to specific frames. This considerably simplifies the implementation of this scheme. Furthermore, the receive acquisition algorithm, according to the various described embodiments of the invention, uses a fixed size aperture which can be stepped in a controlled fashion thereby reducing the probability of false detection of a unique word in the communication burst as the search or track process progresses. In marked contrast, prior techniques depended on pure chance for detection of the right unique word.

According to the exemplary embodiments of the invention, the procedure facilitates a very simple method for reference station switchover. Traffic terminals look at only a reference burst irrespective of which reference station it is transmitted by (if there are multiple reference stations for redundancy), which simplifies the traffic terminal procedure. Receive and Transmit corrections are smooth and orderly both during acquisition and synchronization. The correction information can be used to accurately measure the round trip time to the satellite, the Doppler, and clock inaccuracy. Terminals can be acquired in a live network, without disruption of existing traffic and without human intervention. The system also requires very small bandwidth overhead. Additionally, a fail safe procedure is provided whereby terminals automatically stop transmitting if sync is lost.

BRIEF DESCRIPTION OF THE DRAWINGS

The foregoing and other features, objects, and advantages of the invention will be better understood by reading the following description in conjunction with the drawings, in which.

DETAILED DESCRIPTION

Figure 1:
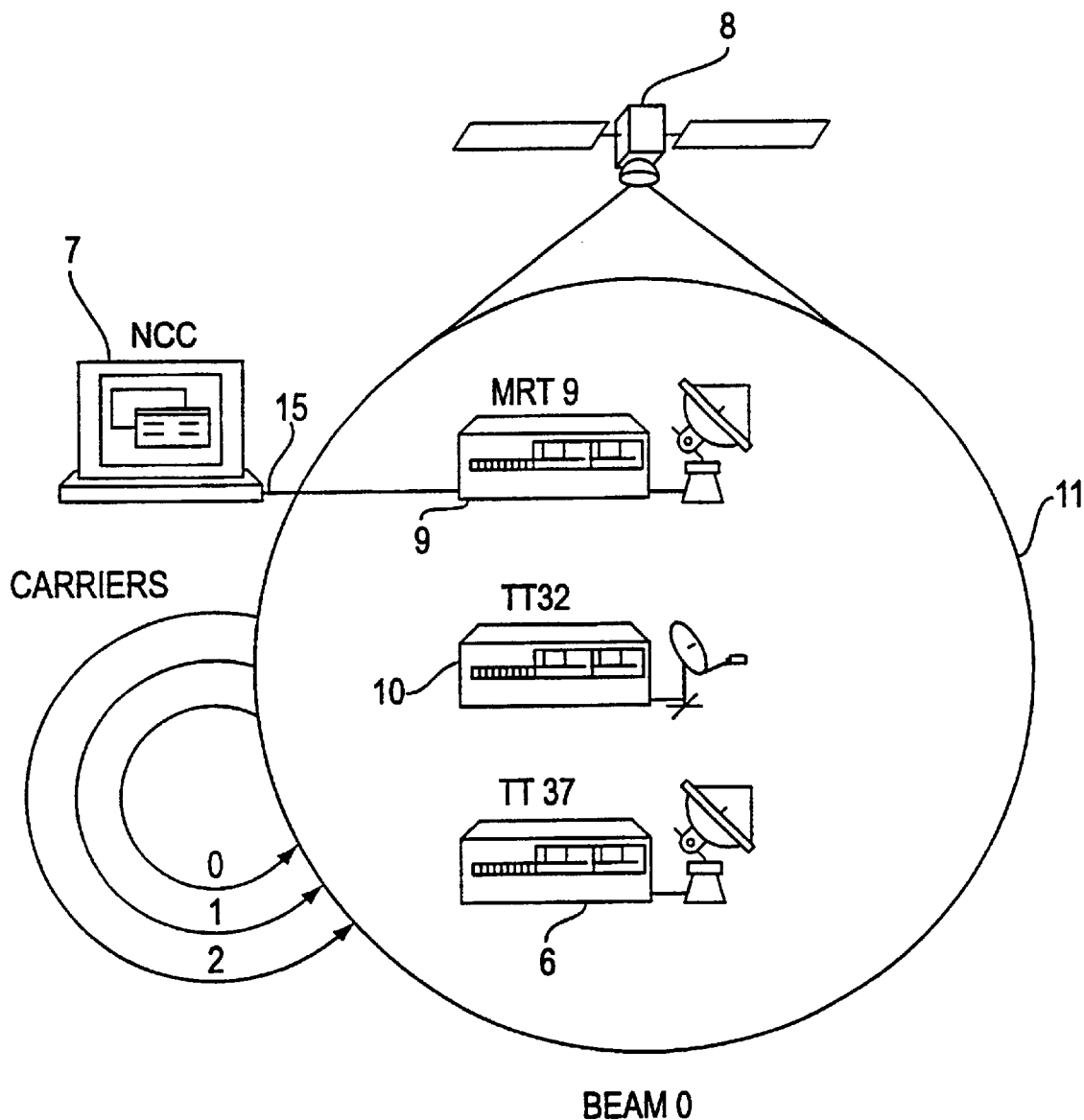
FIG. 1 shows an exemplary system configuration in a global beam mode according to an embodiment of the invention.

The various features of the invention will now be described with respect to the figures, in which like parts are identified with the same reference characters.

The TDMA Network Architecture

Figure 2:
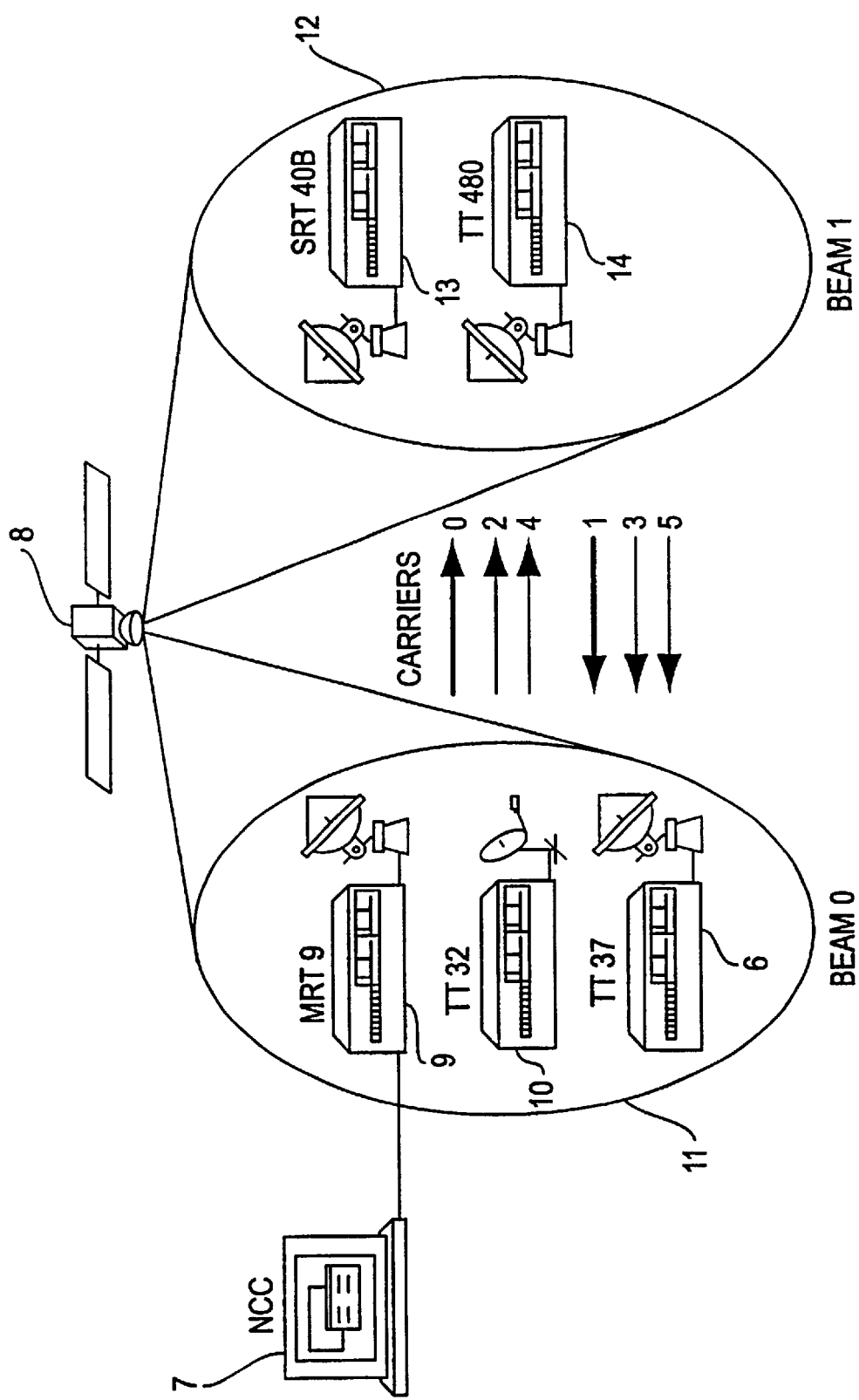
FIG. 2 show an exemplary system configuration in a spot beam mode according to an embodiment of the invention.

Turning to the exemplary embodiments shown in FIGS. 1 and 2, a TDMA network architecture is illustrated. The network consists of a Network Control Center (NCC) 7 and TDMA terminals. The NCC 7 performs overall management and control of the network and does not carry user traffic. Terminals are connected to user telecommunications equipment and communicate with one another using wireless transmissions via the satellite. Some of the terminals in the network act as a source of timing for all other terminals. These are called reference terminals. All other terminals are called traffic terminals for example, terminals 6, 10, and 14.

The Master Reference Terminal (MRT) 9 acts as the primary source of timing for the entire network. For redundancy purposes, there may be an alternate master (AMRT) (not shown), which assumes the role of the MRT 9 if the MRT 9 fails. For networks which work in a spot-beam mode, as shown in FIG. 2, where the MRT 9 does not receive its own transmissions, a secondary reference terminal (SRT) 13 may be used. In this case the SRT 13 acts as a source of timing for all terminals in the same beam as the MRT 9 and the MRT 9 acts as a source of timing for all other terminals. There may also be an alternate secondary reference terminal (ASRT) (not shown) which assumes the role of the SRT 13 if the SRT 13 fails. The NCC may connect to the MRT 9 and the AMRT through a LAN interface 15. One skilled in the art will appreciate the NCC may be located with the MRT or at a remote location. According to one embodiment a SUN™ workstation may be used to implement the NCC.

The TDMA Frame and Burst Structure

Figure 3:
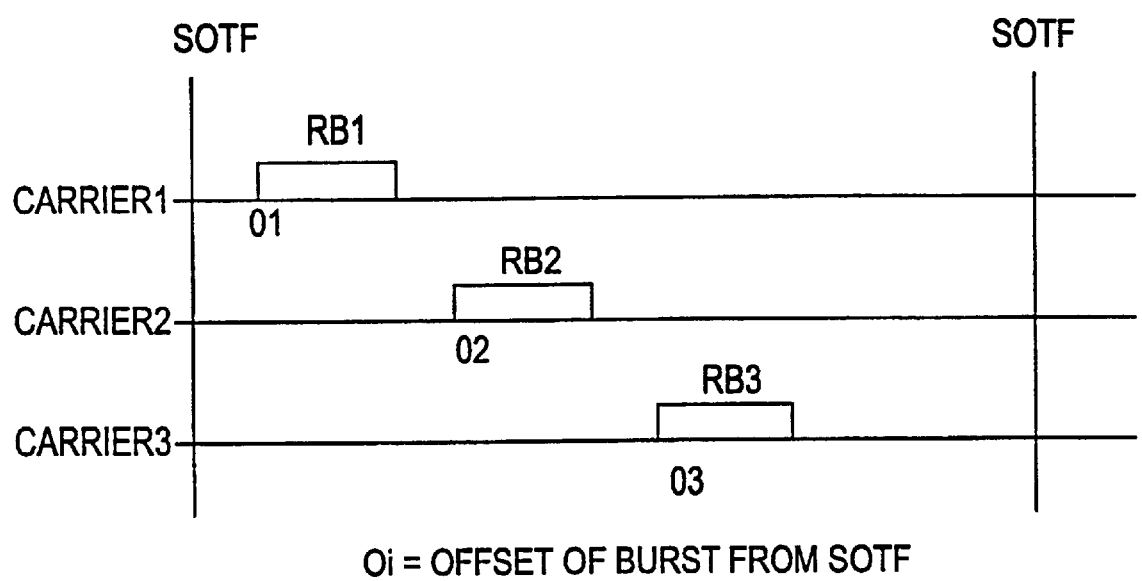
FIG. 3 shows exemplary multiple reference bursts according to an embodiment of the invention.

According to an embodiment of the invention as shown in FIG. 3, the satellite or wireless based TDMA system uses a programmable, fixed-period frame structure. All bursts are timed with respect to this periodic frame. Each terminal uses its local clock to generate a transmit frame period and a receive frame period. The start of a transmit frame period is defined as Start of Transmit Frame (SOTF). The start of a receive frame period is defined as Start of Receive Frame (SORF).

Each frame contains a series of bursts. A burst is a series of data bits transmitted by one terminal and received by one or more terminals. According to this method, there is a minimum dead-time between bursts which is defined as the guard time. The guard time allows for an amount of uncertainty in timing among the different terminals. In conventional systems the guard time is large and usually allocated in advance and is based on a worst case scenario for communications to ensure that signals transmitted on the bursts can be detected and not lost. However, a large guard time is undesirable because it results in loss of usable channel bandwidth. For example, for a geo-synchronous satellite with terninal-to-satellite delay variations of plus or minus 3 milliseconds per day, due to orbit imperfections, a guard-time of 12 milliseconds would be required to ensure that bursts do not overlap due to change in satellite delay. The present invention reduces this guard time to a few microseconds and as a result increases usable bandwidth through use of communication bursts as described below.

Bursts are classified into the following categories based on function. Reference Bursts (RB) are transmitted by reference terminals and are received by all traffic terminals. They carry network management messages from the NCC or reference terminals to all other terminals. RBs are also used by all receiving terminals to derive frame timing. Signaling bursts (SB) are transmitted by traffic terminals and received by the reference terminal. SBs are used carry network management messages from the terminals to the NCC or reference terminal. Traffic bursts (TB) are used to carry user traffic. TBs are transmitted by traffic terminals and reference terminals and received by the traffic terminals and reference terminals. Acquisition bursts (ABs) are used during transmit acquisition of traffic terminals. ABs are transmitted by traffic terminals and received by a reference terminals. Control bursts (CB) are used by the system to maintain a traffic terminal transmit synchronization. CBs are transmitted by traffic terminals and received by reference terminals.

According to the invention all bursts that are used for network management and control (RB, SB, CB, AB) have a uniform but programmable format. The network management bursts contain packets for control purposes. In addition, RBs also contain a frame ID. According to this exemplary embodiment the frame ID is a 16-bit number that is incremented for each frame. An important feature according to the present invention is that various bursts are all programmable by the system. In other words, unlike prior systems the parameters associated with bursts, such as length, frequency, and location within a frame, may be varied dynamically with changing system conditions. Because the parameters are not fixed for the various management bursts as in prior systems, the system according to the present invention may use available, prevailing system conditions, such as bandwidth, more efficiently.

All terminals in the network are synchronized so that the start of transmit frame instants coincide at the satellite. This is accomplished through use of an acquisition and synchronization procedure as is explained in further detail below. According to this embodiment, every terminal has a transmit burst time plan which defines all the bursts currently being transmitted by the terminal. Similarly, each terminal also has a receive burst time plan which includes all the bursts being received by the terminal. According to this embodiment bursts may be added or deleted at any time through use of the command bursts received at the terminal from the network controller. As a result, there is no requirement for the creation of time slots in which the bursts must be contained or fixed parameters to be associated with a burst.

A group of traffic terminals that can be addressed together as a multicast group is called a control group. Alternatively, terminals may also be partitioned into control groups for accessibility. The reference terminal transmits one RB to each control group. In this embodiment the RBs are on different carriers at different frequencies. As a result, the RBs are staggered in time since they cannot overlap in time at the reference station. However, the SOTF instant is identical across all carriers as show in FIG. 3. Unlike other prior TDMA systems, according to the present invention an RB can be located anywhere within a frame.

A burst consists of a preamble portion, a data portion, and a postamble portion. The preamble consists of a Carrier Bit Timing Recovery (CBTR) part and a unique word (UW) part. The preamble is used by the terminals to detect and synchronize to incoming bursts and allows the terminals to lock to the burst through identification of the UW. Each terminal has a two unique words saved in its memory. A first UW is used for reference bursts and a second UW is used for all other bursts. The words are global to the whole system and may be changed through communication with the NCC. According to the present invention the UWs should be chosen such that they appear to be random. In addition, the UWs should be different and as dissimilar to each other as possible in order to prevent a terminal from locking onto the wrong UW. Two Uws are used because during acquisition a terminal only needs to look for the reference burst and not for a traffic burst. This is an important feature of the invention because when a terminal is in the process of acquisition, other terminals in the network may be up and carrying traffic and the process acquisition should not interfere with normal network activity.

While a terminal is attempting to receive a burst, it compares what it identifies as the UW in the incoming burst with the UN stored in the terminal's memory. If the words match, then the UW is said to have been detected. According to this embodiment of the invention, the maximum number of mismatches that may be tolerated in declaring a UW detect is called the UW error threshold. At least two UW error thresholds are used according to the invention based on whether the terminal is operating during acquisition or normal operation. During acquisition it is important to be extremely sure that the terminal has actually locked to the right reference burst and not noise. Furthermore, during acquisition a terminal is searching for the reference burst in a much wider aperture and therefore is more susceptible to locking to unwanted noise. As a result, a smaller UW error threshold is needed in this case. On the other hand, during normal operation the burst will arrive in a much tighter aperture. In this case, a larger UW error threshold can be tolerated.

An aperture is a window of time in which a terminal looks for a burst. The aperture size is CBTR Size+UW Size+Guard Time. During normal operation a small guard time is desirable because acquisition has been established. If the guard time is small more bursts may be packed as closely together resulting in a more efficient utilization of available bandwidth since more bursts may used. According to this embodiment, an aperture with a small guard time is referred to as a TRACK aperture. During receive acquisition a wider aperture is used so that the reference burst can be quickly located. For this wider window a large guard time (close to the TDMA frame time) is used. Such an aperture with a large guard time is referred to as a SEARCH aperture. The apertures are described in further detail with regard to acquisition and synchronization.

Figure 4:
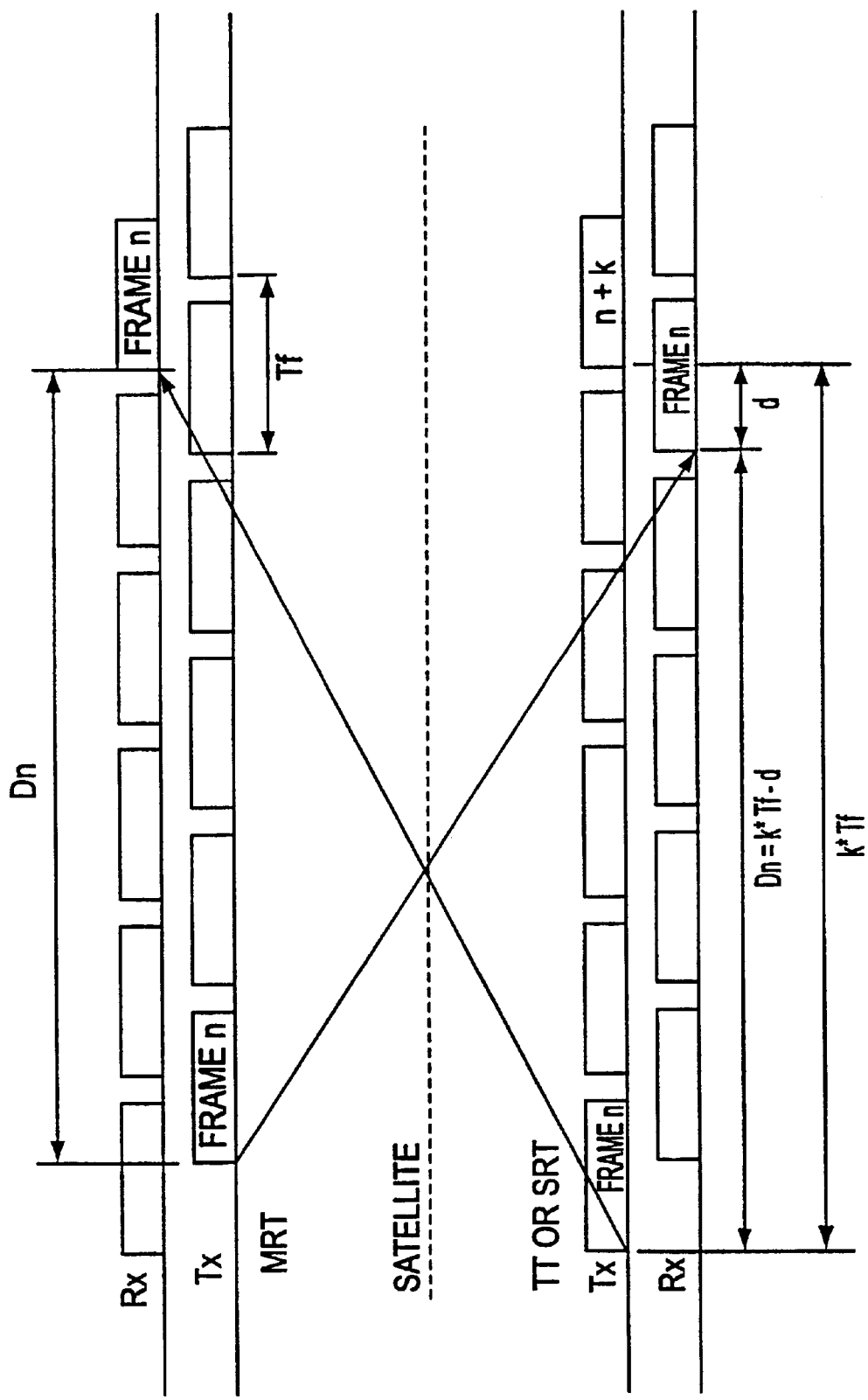
FIG. 4 shows an exemplary TDMA frame structure according to an embodiment of the invention.

Turning to FIG. 4 an exemplary structure of a frame is shown according to one embodiment of the invention. As shown in FIG. 4, a transmitting terminal transmits burst at frame position=BurstOffset. A receiving terminal receives a burst at frame position=BurstOffset+e where e=the UWOffset Error which is the time of arrival error. G=Guardtime of the received burst. It should be noted that the preceding and following bursts may have different guard time values. CBTRLen=Length of the CBTR sequence in symbols. UWLen=Length of the unique word in symbols. RxAperture Start=BurstOffset−GuardTime/2. RxApertureLen= CBTRLen+UWLen+GuardTime. UW Offset is measured from the start of the aperture. Expected UW offset=G/2+ CBTRLen+UWLen.

During network acquisition and synchronization the following procedures are used: Master Reference Terminal (MRT) Transmit procedure; Receive Acquisition and Synchronization procedure (for both reference and traffic terminals); Secondary Reference Terminal (SRT) Transmit procedure; and Traffic Terminal (TT) Transmit procedure. These procedures are described in detail below.

Master Reference Terminal (MRT) Transmit Procedure

When the MRT is down, which includes network startup, the NCC sends a command to the MRT to start its transmit procedure. Upon receiving the command to start its transmit procedure, the MRT starts its transmit frame timing at some arbitrary point in time. This frame time is derived using the local MRT clock and is never re-adjusted. The MRT should have a stable clock, for example, a $10^9$ ppm or better may be used according to this embodiment of the invention. The reference burst is then transmitted every frame in its correct position. The reference burst contains a frame ID which is set to 0 at network startup and incremented thereafter on every frame. The MRT will stay in transmit sync as long as the MRT continues to get a "Continue MRT transmit procedure" command from the NCC. If these commands stop then the MRT times out and stops its transmission. If there are multiple reference bursts, the MRT transmits all of them while in transmit sync as illustrated in FIG. 3.

Receive Acquisition and Synchronization Procedure

All terminals, including the RTs, perform this procedure on startup. In order to perform receive acquisition, the terminal needs to have the definition of its reference burst, which includes its position in the TDMA frame, frequency, coding, data size, parameters, etc.

The terminal starts its receive frame timing at some arbitrary point in time and starts generating SORFs. The terminal then looks for the reference burst in its receive frame with the SEARCH aperture. In this case, the UW error threshold is set to a small value and the hardware is programmed to look for the reference burst UW. According to this exemplary embodiment a UW error threshold of zero may be used.

While the terminal is in the search mode, if the UW is not detected for N frames, the start of receive frame and therefore the start of SEARCH aperture is advanced by a fraction of the frame time and the search is then repeated. According to one preferred embodiment the frame time is advanced by 20% for each iteration. On the other hand, if the UW is detected, the terminal then enters a confirm mode during which the terminal verifies that it has locked to the right reference burst. According to this embodiment, the terminal no longer looks for the RB with the SEARCH aperture. The terminal adjusts its SORF so that the expected UW position matches the measured UW position. Finally, the terminal again looks for the RB, however, this time it uses the TRACK aperture. The TRACK aperture is positioned at the expected UW position of the reference burst. The terminal then verifies the following:

(1) the UW is detected in the track aperture;

(2) the data in the burst is being received without any errors (for example, using the Reed-Solomon Check bits, or a CRC check, or some other means of error detection); and (3) the frame number received in the reference burst increments every frame.

If any of the above three conditions fail, the terminal concludes that the expected UW was falsely detected and adjusts the start of receive frame so that the aperture begins after the false detect and then restarts the acquisition procedure. By starting the new aperture just beyond the falsely detected UW, the terminal steps over the false UW and thereby reduces the chance of finding the false UW again.

If the UW is detected in the confirm mode, the terminal adds all other bursts in its receive burst time plan (BTP) to its receive frame. The terminal's receive frame ID (RFID) is then set to the value received in the reference burst and the terminal is now in receive synchronization. The RFID will be incremented every frame while the terminal is in synchronization.

While the terminal is in receive synchronization, the terminal measures the UW offset for the reference burst. When the UW exceeds a threshold, the terminal then adjusts the SORF so that the measured offset matches the expected offset. According to this exemplary embodiment, the threshold is a small fraction of the guard time for example 10%. At this time the UW error threshold can be set to the higher value. The frame ID received in the reference burst is then checked against the local RFID. If the RFID does not match, or if no reference burst is correctly received for T seconds, the terminal loses receive synchronization and starts the procedure all over again. According to this embodiment the RFID may be placed at the beginning of the reference burst.

Secondary Reference Terminal (SRT) Transmit Procedure

According to another embodiment of the invention, when the SRT is down (which includes network startup), once the MRT transmit procedure is operational, the NCC periodically sends a command to the SRT to start its transmit procedure. The command is transmitted as a message in the reference burst. When the SRT attains receive synchronization, the SRT receives this command and starts its transmit procedure.

According to this procedure, the SRT starts its transmit frame at an offset d with respect to its receive frame and sets a local counter called the transmit frame ID (TFID). The TFID is incremented every transmit frame and is sent in the reference burst transmitted by the SRT. The values for d and the TFID are computed as follows.

Da is an estimate of the round trip delay from the SRT to satellite. This delay can be estimated from the positions (latitude, longitude, and altitude) of the terminal and satellite. In the following equations k is an integer, Da and Frame Time are in the same units (e.g., milliseconds).

If (Da mod Frame Time)≠0 then $k=[Da/\text{Frame Time}]+1$ $d=k*\text{Frame Time}-Da$ else $k=[Da/\text{Frame Time}]$ $d=0$ endif $TFID=RFID+k+1$ Once the transmit frame has been started the SRT is in transmit synchronization. While in transmit synchronization the SRT attempts to keep its Da fixed by adjusting the start of its transmit frame (SOTF) as follows.

Compute Dn as follows (where d is the measured offset between SORF and SORT at the SRT):

DnO=(TFID−RFID)*Frame Time−d

Dn 1=DnO−Frame Time

Dn2=DnO+Frame Time

Figure 5:
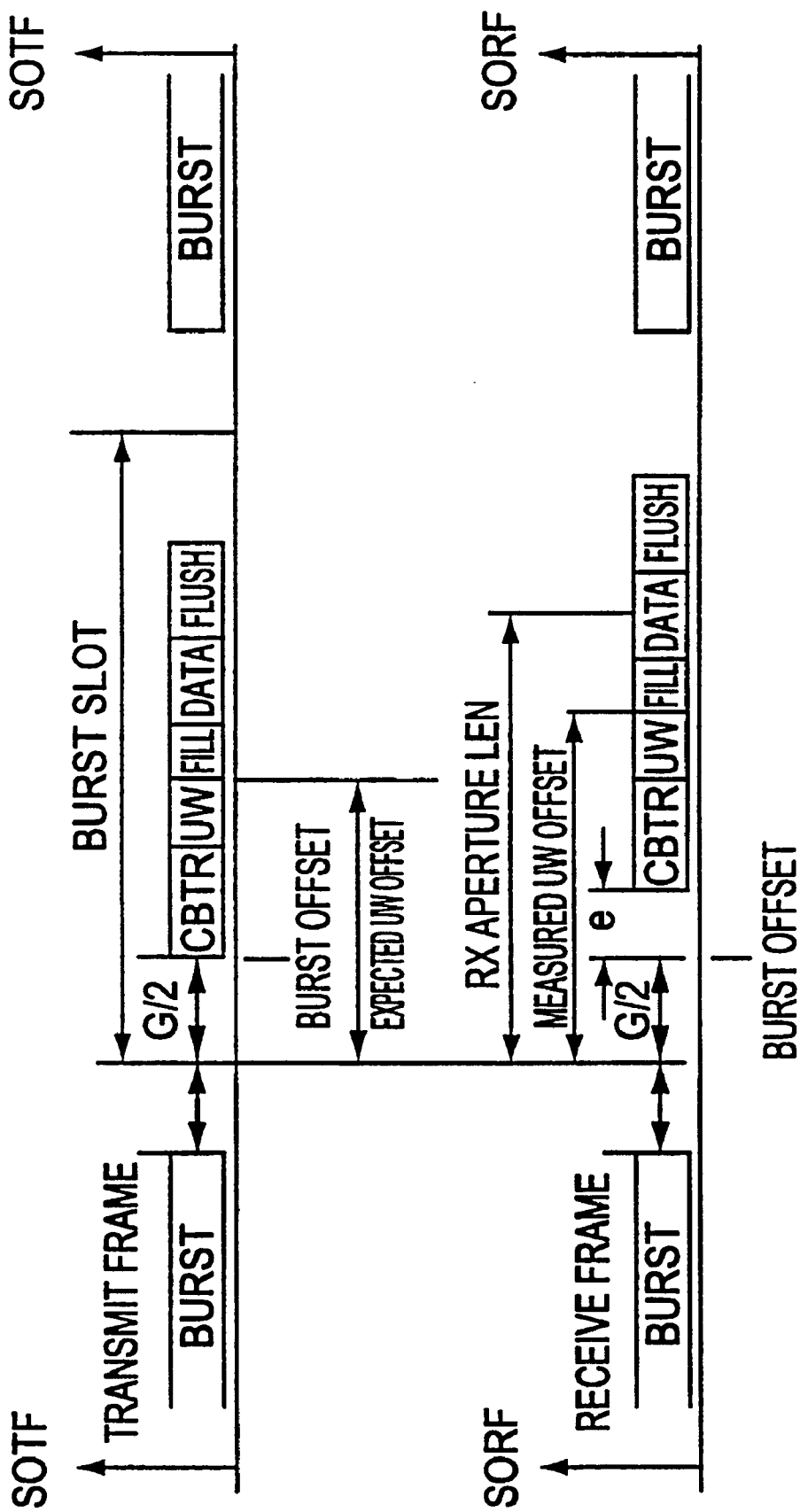
FIG. 5 shows exemplary Dn relationships according to an embodiment of the invention.

Dn=Select from DnO, Dn1, and Dn2 the value which is closest to Da if Dn−Da>0 then Delay the SOTF by Dn−Da else Advance the SOTF by Dn−Da Turning to the exemplary embodiment shown in FIG. 5, various Dn relationships are illustrated. As shown in FIG. 5 Tf is the frame time.

The SRT stays in transmit synchronization as long as the SRT continues to get a "Keep SRT transmit procedure going" command from the NCC. When these commands stop, the SRT transmit procedure times out and stops transmission. While in transmit synchronization, the SRT also transmits one or more RBs.

Traffic Terminal (TT) Transmit Procedure

The traffic terminal transmit procedure starts off under NCC control after the terminal has attained receive synchronization. In order to obtain transmit acquisition, special bursts called acquisition bursts (AB) are used. The ABs are transmitted by the traffic terminal that is being transmit acquired and received by the reference station. The ABs have a relatively large guard time (e.g., on the order of millisecs). One skilled in the art will appreciate that the exact guard time required depends on the satellite station keeping the accuracy of the current position of the satellite and the position of the traffic terminal. As these positions are better defined the guard time required decreases.

According to this embodiment of the invention, the NCC has a pool of Abs that may be used by the traffic terminals. In order to transmit acquire a traffic terminal the NCC picks a free AB from the pool and sends an ACQCMD message to the traffic terminal. The ACQCMD message contains the definition of the AB to be used by the traffic terminal including its location within the frame, size, frequency, etc. Until this command is received, the traffic terminal does not transmit. However, upon receiving the ACQCMD, the traffic terminal starts its transmit frame at offset d with respect to its receive frame and sets its initial TFID as follows.

According to this embodiment Da is an estimate of the round trip delay from the traffic terminal to the satellite. The delay can be estimated from the positions (latitude, longitude, and altitude) of the terminal and satellite. As represented in the computation below k is an integer, Da, and Frame Time are in the same units (e.g., milliseconds).

if (Da mod Frame Time)≠0 then $k=Da/\text{FrameTime}+1$ $d=k*\text{Frame Time}-Da$ else $k=Da/\text{Frame Time}$ $d=0$ end if $TFID=RFID+k+1$ The traffic terminal then transmits N responses in N successive frames. The responses are defined as ACQRESP. Each ACQRESP contains the traffic terminal's ID, its TFID, and its current Dn estimate. The TFID is incremented every transmit frame. However, it should be noted that the AB is transmitted only when the ACQRESPs are being sent. After transmitting these responses the traffic terminal starts a timer and waits for a synchronization command (SYNCCMD) from the NCC. When the reference terminal receives the ACQRESPs from a traffic terminal, the reference terminal forwards them to the NCC along with the error in UW offset. When the NCC receives a ACQRESP it sends a UW error and TFID correction to the traffic terminal in a SYNCCMD.

When the SYNCCMD is received by the traffic terminal, the traffic terminal applies the UW error correction to its SOTF. The traffic terminal also applies the TFID correction to its TFID and then enters transmit synchronization. At this time the traffic terminal adds all bursts in its transmit burst time plan to its transmit frame. This includes a control burst which is used to maintain transmit synchronization. If the SYNCCMD is not received and the timer expires at the traffic terminal, the traffic terminal stops its transmit frame and waits for an ACQCMD from the NCC.

According to this embodiment of the invention the AB does not have to be assigned to the traffic terminal for the entire round trip time required to issue an ACQCMD and send a response back. In contrast, the AB just has to be reserved for those frames when the traffic terminal is expected to send ACQRESP messages. As a result, pipelining of the traffic terminals is allowed which in turn helps to reduce network acquisition time after a network crash, for example.

Once in transmit synchronization, the traffic terminal transmits a control burst (CB) in order to maintain synchronization. A CB is transmitted once every C frames which is defined as a control frame. The size of the control frame or C is selected based on the drift in time caused by satellite motion. In order to prevent drifting in time during communication, that will cause the terminal to lose its synchronization, a CB is sent to the NCC and back in order to make the necessary correction in timing. According to a preferred embodiment of the invention, C is picked such that the traffic terminal has not drifted in time more than 5 microseconds. However, one skilled in the art will appreciate that this time will depend on the type of network and satellites used and therefore may be adjusted accordingly.

The control burst contains a message containing the terminal's ID, its current Dn estimate, and the TFID. The reference terminal upon receiving the CB message, measures the UW offset error and the difference between the TFID in the message and the local RFID of the reference station. The reference terminal then sends a response back to the traffic terminal with a timing correction and a TFID correction. The original message is sent to the NCC along with the UW offset error and the TFID error. This allows the NCC to determine if a terminal is up in addition to the terminal's current Dn estimate. Upon receiving the response, if a round trip time has expired since the last time the traffic terminal applied a correction to its transmit frame, the traffic terminal applies the new timing correction to its transmit frame. The TFID should never have to be corrected; however, if this happens the terminal loses transmit synchronization. Furthermore, If n responses from the reference terminal are lost, the terminal also loses transmit synchronization. When transmit sync is lost the terminal disables transmission of all bursts and waits for the next ACQCMD.

One skilled in the art will appreciate that the procedures described above can be implement in software in the network command control, reference terminals, and traffic terminals, respectively.

According to the present invention, the system is able to handle global, spot, and mixed mode beam configurations. In addition, the system is able to handle multiple spot beams, large numbers of terminals, multiple carriers, and multiple reference bursts. Furthermore, the procedures are simple, uniform, and robust and do not require special purpose hardware support. The system according the exemplary embodiments of the invention can also handle large doppler and local clock variations. As a result the system is suitable for large delay satellite networks as well as low to medium delay terrestrial wireless and cable networks.

The system according to the present invention also provides that all parameters are programmable making it easy to modify and optimize bursts, timing and conmmunication between terminals for specific networks. Procedures are controlled using message exchanges which are not hard assigned to specific frames. This considerably simplifies the implementation of this scheme according to the invention. Furthermore, the receive acquisition algorithm, according to the various described embodiments of the invention, uses a fixed size aperture which can be stepped in a controlled fashion thereby reducing the probability of false detects as the algorithm progresses. In marked contrast, prior techniques depended on pure chance for detection of the right unique word.

According to the exemplary embodiments of the invention, the procedure facilitates a very simple method for reference station switchover. Traffic terminals look at only a reference burst irrespective of which reference station it is transmitted by (if there are multiple reference stations for redundancy), which simplifies the traffic terminal procedure. Receive and Transmit corrections are smooth and orderly both during acquisition and synchronization. The correction information can be used to accurately measure the round trip time to the satellite, the Doppler and clock inaccuracy. Finally, terminals can be acquired in a live network, without disruption of existing traffic and without human intervention. The system also requires very small bandwidth overhead. Additionally, a fail safe procedure is provided whereby terminals automatically stop transmitting if synchronization is lost.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A time division multiple access wireless communications network having a fixed programmable transmission frame comprising:

a communications terminal for communicating signals on bursts within the transmission frame, said terminal comprising burst time plan means for dynamically storing burst time plan information and for communicating signals on bursts based upon said time plan information;

a network command controller for coordinating communications by said communication terminal, said network command controller being operative to maintain said transmit and receive time plans and further comprising means for dynamically changing the values of parameters of said bursts in said burst time plan means; and a reference terminal connected to said network controller for transmitting and receiving said signals on said bursts, wherein said bursts have parameters which may be dynamically changed by said network command controller.

2. The network of claim 1, wherein said parameters may be changed substantially in real time.

3. The network of claim 2, wherein said parameters include one of length, frequency, or location within a frame.

4. A time division multiple access wireless communications network having a fixed programmable transmission frame comprising:

a communications terminal for communicating signals on bursts within the transmission frame;

a network command controller for coordinating communications by said communication terminal; and a reference terminal connected to said network controller for transmitting and receiving said signals on said bursts, wherein said bursts have parameters which may be dynamically changed by said network command controller, wherein said reference terminal transmits a reference burst to said communications terminal and said reference burst is used to derive network timing at said communications terminal and said reference burst may be located anywhere within the transmission frame.

5. The system of claim 4, wherein the frame is a programmable, fixed period frame.

6. The system of claim 4, wherein said communications terminal includes a local clock and generates a transmit frame period and receive frame period in response to said reference burst.

7. The system of claim 4 further comprising:

a plurality of communications terminals, wherein said plurality of terminals are partitioned into control groups and said reference terminal transmits a separate reference burst to each control group, each said separate reference burst being transmitted on different carriers at a different frequency and not overlapping in time with each other.

8. The system of claim 7, wherein said plurality of terminals include a local clock and generate a start of transmit frame period and receive of transmit frame period in response to said reference burst and said start of transmit frame period is identical across said different carriers.

9. The system of claim 4, wherein said communications terminal determines a window of time in which to look for a burst.

10. The system of claim 9, wherein said communications terminal generates a search window having a first guard time when said terminal is acquiring synchronization to said network system and generates a track window having a second guard time that is smaller that said first guard time once synchronization is acquired.

11. The system of claim 9, wherein said reference burst a includes a unique word portion and said communication terminal search for said unique word in said aperture and detects said unique word if a unique word stored at said communication terminal matches unique word found in said aperture.

12. The system of claim 11, wherein the maximum number of mismatches allowed for detecting a unique word is set as a first threshold or a second threshold and said first threshold is used during acquisition of system timing, said second threshold is used after acquisition has been established, where said first threshold is smaller than said second threshold.

13. The system of claim 4, wherein the system uses first and second unique words, and said first unique word is used in a reference burst and said second unique word is used in all other bursts.

14. The system of claim 1, wherein said bursts include a reference burst transmitted by said reference terminal and are received by said communications terminal carrying network management messages from said network command controller and are also used by all receiving terminals to derive frame timing.

15. The system of claim 1, wherein said bursts include a signaling burst transmitted by said communications terminal and are used to carry network management messages from the communications terminal to said network command controller or said reference terminal.

16. The system of claim 1, wherein said bursts include a traffic burst which are transmitted by said communications terminal and reference terminal and received by said communications terminal and reference terminal and carry traffic data.

17. The system of claim 1, wherein said bursts include an acquisition burst used during transmit acquisition of communications terminal, said acquisition burst being transmitted by said communications terminal and received by said reference terminal.

18. The system of claim 1, wherein said bursts include a control burst which maintains a traffic terminal transmit synchronization.

19. A method for synchronization of a terminal in a TDMA communications system, comprising the steps of:

generating a receive frame time at an arbitrary point in time;

generating a search aperture;

searching for a reference burst within said receive frame using said search aperture;

at said terminal generating a transmit frame period and receive frame period based on finding said reference burst within said search aperture, maintaining a transmit burst plan and a receive burst plan, and adding all other bursts in said terminal's receive burst time plan to said receive frame, and varying the content of said transmit burst plan and receive burst plan under central network control.

20. The method of claim 19 wherein the step of searching for said reference burst further comprises the steps of:

searching for a unique word within said receive frame; and advancing said search aperture by a fraction of the frame time if said unique word is not found and repeating said search.

21. The method of claim 20 further comprises the steps of:

adjusting said receive frame time based on said unique word if said unique word is found within said frame; and searching for said reference burst using a track aperture, wherein said track aperture is positioned at the expected position of said unique word of said reference burst.

22. The method of claim 21 further comprising the three steps of:

searching for said unique word in the track aperture;

determining if data being received in the reference burst is error free; and determining if a frame number in said reference burst is increments each frame, wherein if any of said three steps fail, said terminal adjusts the start of receive frame to begin after a falsely detected unique word and repeating the step of searching for a unique word.

23. A method for acquisition of a terminal in a TDMA communications system including a network controller, comprising the steps of:

picking an unused acquisition burst from a pool of acquisition bursts;

transmitting and acquisition command from the controller to the terminal including the parameters for said picked acquisition burst;

after receiving the acquisition command at the terminal, generating a transmit frame offset and transmit frame ID at the terminal;

transmitting an acquisition response from the terminal to the controller, wherein said acquisition response includes the terminal's ID, transmission frame ID and current delay estimate.

24. The method of claim 23 further comprising the steps of:

starting a timer at the terminal;

receiving said acquisition response at the controller; and transmitting a synchronization command including a unique word error and transmission frame ID correction to the traffic terminal, wherein if said synchronization command is received by the terminal the terminal applies the transmission frame ID correction to its transmission frame ID and begins transmit synchronization.

25. The method of claim 24, wherein if said terminal does not receive said synchronization command and said timer times out, the terminal waits for another acquisition command.

26. The method of claim 25, wherein the terminal maintains synchronization by transmitting control bursts.

27. A time division multiple access wireless communications system comprising:

a communications terminal for communicating signals on bursts within a TDMA frame; and a controller for coordinating communications by said terminal, wherein the terminal comprises:

means for generating a receive frame time at an arbitrary point in time, means for generating a search aperture for a reference burst within said receive frame, means for generating a transmit frame period and receive frame period based on finding said reference burst within said search aperture, said frame periods being freely set with respect to said reference burst, and means for maintaining a transmit burst plan and a receive burst plan, and adding all other bursts in said terminal's receive burst time plan to said receive frame.

28. The system of claim 27 wherein said terminal searches for a unique word within said receive frame and advances said search aperture by a fraction of the frame time if said unique word is not found and repeating the search.

29. The system of claim 28 wherein said terminal adjusts said receive frame time based on said unique word if said unique word is found within said frame and searches for said reference burst using a track aperture, said track aperture being positioned at the expected position of said unique word of said reference burst.

30. The system of claim 29 wherein said terminal searches for said unique word in the track aperture and determines if data being received in the reference burst is error free and if a frame number in said reference burst is incremented in each frame, whereby if any of said three steps fails, said terminal adjusts the start of receive frame to begin after a falsely detected unique word and repeats the step of searching for a unique word.

31. A time division multiple access wireless communications system comprising:

a communications terminal for communicating signals on bursts within a TDMA frame; and a controller for coordinating communications by said terminal, wherein said controller picks an unused acquisition burst from a pool of acquisition bursts and transmits an acquisition command from said controller to said terminal including the parameters for said picked acquisition burst and after receiving said acquisition command at said terminal, generating a transmit frame offset and transmit frame ID at the terminal and transmitting an acquisition response from said terminal to said controller, whereby said acquisition response includes the terminal's ID, transmission frame ID and current delay estimate.

32. The system of claim 31 wherein said terminal includes a timer and said timer is started after sending said acquisition response.

33. The system of claim 32 wherein said control receives said acquisition response and transmits a synchronization command including a unique word error and transmission frame ID correction to the traffic terminal, whereby if said synchronization command is received by the terminal the terminal applies the transmission frame ID correction to its transmission frame ID and begins transmit synchronization.

34. The system of claim 33, wherein if said terminal does not receive said synchronization command said timer times out and said terminal waits for another acquisition command.

35. The system of claim 33, wherein said terminal maintains synchronization by transmitting control bursts to said controller.

* * * * *